United States Patent [19]

Payne

[11] Patent Number: 5,507,632
[45] Date of Patent: Apr. 16, 1996

[54] ROTATIONAL MOLDING APPARATUS

[76] Inventor: LeRoy Payne, 3300 Nicholas La., Molt, Mont. 59057

[21] Appl. No.: 249,744

[22] Filed: May 26, 1994

Related U.S. Application Data

[60] Continuation-in-part of Ser. No. 950,135, Sep. 24, 1992, Pat. No. 5,316,701, which is a division of Ser. No. 707,656, May 30, 1991, Pat. No. 5,188,845, which is a continuation-in-part of Ser. No. 417,502, Oct. 5, 1989, Pat. No. 5,022,838, which is a continuation-in-part of Ser. No. 271,686, Nov. 16, 1988, Pat. No. 4,956,133, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.⁶ .................................................. B29C 45/33
[52] U.S. Cl. .......................... 425/4 R; 264/40.5; 264/310; 264/328.11; 425/150; 425/435; 425/576
[58] Field of Search ........................ 425/4 R, 150, 425/435, 574, 576; 264/405, 310, 328.6, 328.11

[56] References Cited

U.S. PATENT DOCUMENTS

| | | | |
|---|---|---|---|
| 3,799,729 | 3/1974 | Hagen | 425/435 |
| 4,671,753 | 6/1987 | Payne | 425/4 R |
| 4,749,533 | 6/1988 | Payne | 425/435 |
| 4,956,133 | 9/1990 | Payne | 425/435 |
| 4,956,135 | 9/1990 | Payne | 425/435 |
| 5,011,636 | 4/1991 | Payne | 425/435 |
| 5,022,838 | 6/1991 | Payne | 425/435 |
| 5,188,845 | 2/1993 | Payne | 425/435 |
| 5,316,701 | 5/1994 | Payne | 425/435 |

Primary Examiner—Tim Heitbrink
Attorney, Agent, or Firm—Arthur L. Urban

[57] ABSTRACT

Multiaxis rotational molding apparatus includes a support portion, a molding portion, a mixing portion and a control portion. The support portion includes an arm member disposed in a generally horizontal orientation and having one end extending from an upstanding supporting section. The molding portion includes a mold supporting assembly pivotally connected to a free end of the arm member and an independently rotatable mold connector section. The mold supporting assembly includes a central passage therethrough from a pivotal connection with the arm member and through the mold connector section. A mold assembly includes at least two separable mold sections forming a substantially enclosed cavity. The mixing portion includes an elongated section extending axially within the central passage through the mold supporting assembly adjacent the mold connector section. The mixing section includes a plurality of deflector sections disposed along the length thereof. A plurality of inlet conduits extends along the arm member and is operatively connected to an inlet end of the mixing section. A hollow probe member extends from an outlet end of the mixing section into the cavity of the mold assembly. The control portion includes actuators rotating the mold connector section and the mold assembly affixed thereto and actuators pivoting the mold supporting assembly and the mold assembly affixed thereto with respect to the arm member, a programmable memory, a coordinator, monitors and circuitry.

10 Claims, 1 Drawing Sheet

ROTATIONAL MOLDING APPARATUS

CROSS-REFERENCES TO RELATED APPLICATIONS

This application is a continuation-in-part of application Ser. No. 950,135, filed Sep. 24, 1992 now U.S. Pat. No. 5,316,701, which in turn is a division of application Ser. No. 707,656, filed May 30, 1991, now U.S. Pat. No. 5,188,845, which in turn is a continuation-in-part of application Ser. No. 417,502, filed Oct. 5, 1989, now U.S. Pat. No. 5,022,838, which in turn is a continuation-in-part of application Ser. No. 271,686, filed Nov. 16, 1988, now U.S. Pat. No. 4,956,133, which in turn is a continuation-in-part of application Ser. No. 202,267, filed Jun. 6, 1988, now U.S. Pat. No. 4,956,135, which in turn is a continuation-in-part of application Ser. No. 890,742, filed Jul. 30, 1986, now U.S. Pat. No. 4,749,533 which in turn is a division of application Ser. No. 766,498, filed Aug. 19, 1985, now U.S. Patent No. 4,671,753.

BACKGROUND OF THE INVENTION

This invention relates to a novel molding apparatus and more particularly relates to a new multiaxis rotational molding apparatus.

The production of man-made plastic and resin articles is an industry that utilizes a high degree of automatically controlled continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand building procedures require a large amount of labor, supervision and continuous inspection to insure that a reasonable level of quality is achieved. This greatly increases the cost of the product.

The applicant's earlier patents listed above provide novel apparatus for producing both large and small molded structures continuously. The apparatus includes unique combinations of components to produce a wide variety of different products. Achieving this capability requires a major capital investment. Also, personnel to utilize the broad parameters of the apparatus normally are highly trained and experienced.

SUMMARY OF THE INVENTION

The present invention provides a novel molding apparatus which not only overcomes the deficiencies of present technology but also provide features and advantages not found in earlier expedients. The multiaxis rotatable molding apparatus of the invention provides a simple inexpensive means for the production of uniform high quality products efficiently.

The multiaxis rotational molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus of the invention can be operated by individuals with limited mechanical skills and experience. High quality molded structures can be produced by such persons safely and efficiently with a minimum of supervision.

The molding apparatus of the invention can be modified to mold a wide variety of new structures. Variations both in product configuration and composition can be attained simply and conveniently with the apparatus of the invention. Even with such variations, uniformity and quality of product dimensions and shapes are still maintained without difficulty.

BRIEF DESCRIPTION OF THE DRAWING

These and other benefits and advantages of the novel multiaxis rotatable molding apparatus of the present invention will be apparent from the following description and the accompanying drawings in which.

DESCRIPTION OF THE PREFERRED EMBODIMENTS

Figure 1:
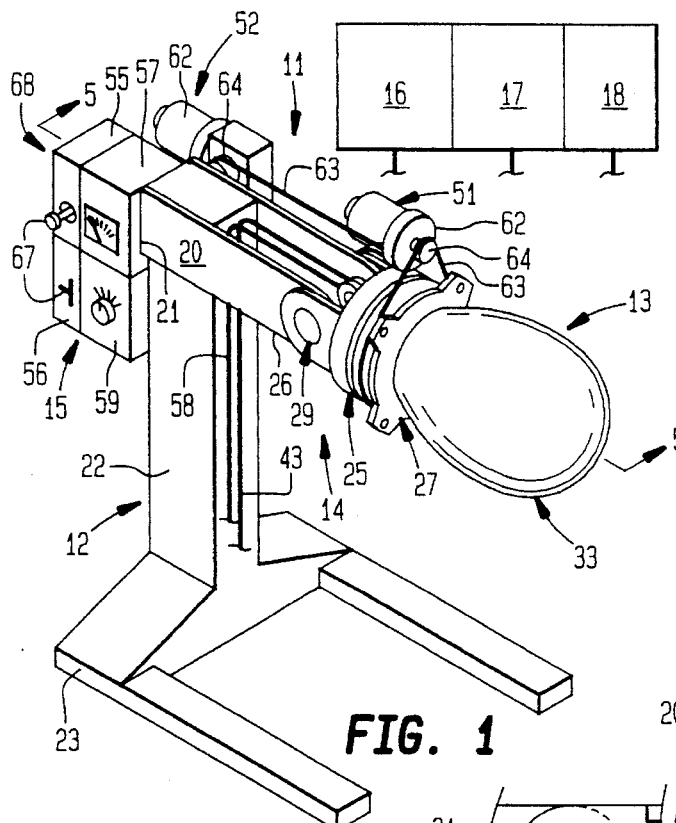
FIG. 1 is a view in perspective of one form of multiaxis rotatable molding apparatus of the invention.
Figure 2:
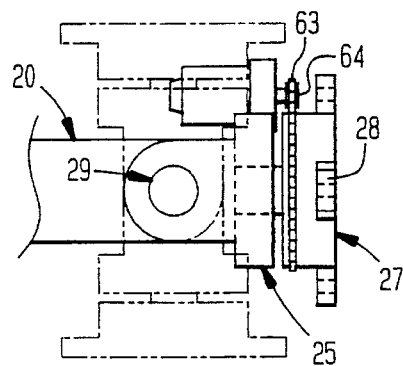
FIG. 2 is an enlarged fragmentary side view of a mold supporting assembly of the apparatus shown in FIG. 1.
Figure 3:
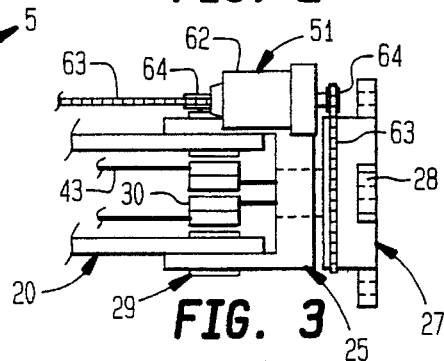
FIG. 3 is an enlarged fragmentary top view of a mold supporting assembly of the apparatus shown in FIG. 1.

As shown in FIGS. 1–5 of the drawings, one form of multiaxis rotational molding apparatus 11 of the present invention includes a support portion 12, a molding portion 13, a mixing portion 14 and a control portion 15.

The support portion 12 of the multiaxis rotational molding apparatus 11 of the invention includes an arm member 20 disposed in a generally horizontal orientation. One end 21 of arm member 20 extends from an upstanding supporting section 22. Advantageously, the support portion 12 includes a base section 23 from which the upstanding supporting section 22 extends.

The molding portion 13 of the rotational apparatus 11 includes a mold supporting assembly 25. The mold. supporting assembly is pivotally connected to a free end 26 of the arm member 20 remote from the end 21 thereof which extends from the upstanding supporting section 22.

The mold supporting assembly 25 includes an independently rotatable mold connector section 27. The mold supporting assembly also includes a central passage 28 therethrough. The central passage extends from a pivotal connection 29 with the arm member 20 and through the mold connector section 27.

Figure 4:
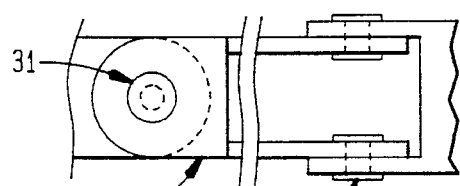
FIG. 4 is a fragmentary top view of another form of arm member of the apparatus shown in FIG. 1.

Advantageously, the pivotal connection 29 of the arm member 20 and the mold supporting assembly 25 includes a rotatable coupling shown as swivel coupling 30. The arm member 20 advantageously may include more than one pivotal connection 31 along its length (FIG. 4).

The molding portion 13 also includes a mold assembly 33. The mold assembly includes at least two separable mold sections 34, 35. The assembled mold sections form a substantially enclosed cavity 36. Connecting means shown as clamps 37 selectively secure the mold sections 34, 35 together. Also, connecting means 38 secure the assembled mold sections to mold connector section 27. The mold assembly advantageously includes a vent 39 preferably disposed concentrically with a probe member 40.

The mixing portion 14 of the multiaxis rotational molding apparatus 11 of the present invention includes an elongated mixing section 41. The mixing section 41 extends axially within the central passage 28 through mold supporting assembly 25 adjacent the mold connector section 27. The mixing section 41 also includes a plurality of deflector sections 42 disposed along the length thereof.

A plurality of inlet conduits 43 extend along the arm member 20 and are operatively connected to an inlet end 44 of the mixing section 41. Advantageously, the inlet conduits extend through the pivotal connection 29 with the mold supporting assembly 25.

A hollow probe member 40 extends from an outlet end 47 of the mixing section 41 into mold cavity 36 of the mold assembly 33. The probe member 40 preferably is axially movable within mold cavity 36 by drive 50.

The control portion 15 of the molding apparatus 11 of the present invention includes actuating means including drive means 51, 52. Drive means 51 rotates mold connector section 27 and the mold assembly 33 affixed thereto. Drive means 52 pivots the mold supporting assembly 25 and the mold assembly 33 affixed thereto with respect to the arm member 20.

The control portion 15 also includes programmable memory means 55, coordinating means 56, monitoring means 57 and circuitry 58 therefor. The drive means 51, 52 advantageously includes gear motors 62, chains 63 and sprockets 64 connected thereto. Preferably, the gear motors are variable speed motors. The actuating means may activate other components such as pumps, valves, drives, etc.

Figure 5:
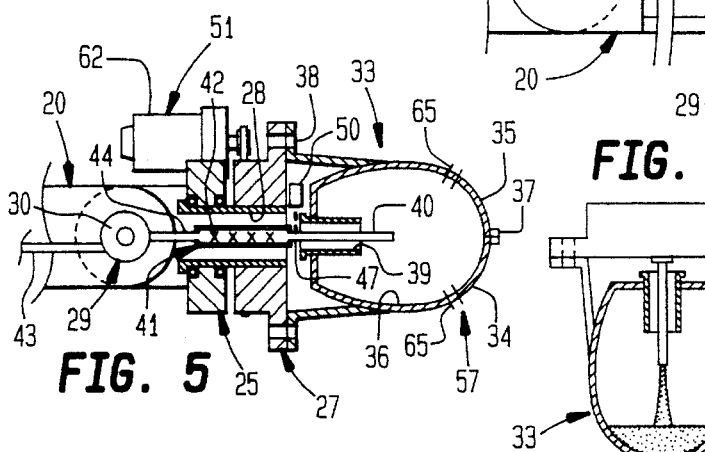
FIG. 5 is a side view in section of the molding and mixing portions of the apparatus shown in FIG. 1 taken along line 5—5 thereof.

Arm member 20 advantageously includes a longitudinal passage in which inlet conduits 43 and control circuitry 58 are disposed. Preferably, the monitoring means 57 includes optical fibers 65 extending through the mold sections 34, 35 as shown in FIG. 5.

The coordinating means 56 advantageously includes a process controller 59 that initiates changes in the flows of materials and speeds of drives to bring variations therein back to the rates specified in the programs present in the memory 55. This coordination commonly is achieved through the transmission of information such as digital pulses from the monitors and/or sensors at the control components to the process controller 59.

The operating information is compared with the preselected programming parameters stored in the memory 55. If differences are detected, instructions from the controller change the operation of the components to restore the various operations to the preselected processing specifications.

In the use of the multiaxis rotational molding apparatus 11 of the present invention, the design of the structure desired first is established. Then, the design is programmed into the memory 55.

To start the operation of the apparatus 11, buttons and/or switches 67 of a control panel 68 are depressed to activate the memory 55 and the other components of the control portion 15. The coordinating means 56 energizes drive means 51, 52.

Also, pumps, valves and monitors (not shown) are energized by the coordinating means 56 in the preselected sequences of the program stored in the memory 55. This causes the raw materials in reservoirs 16, 17, 18 to advance along the inlet conduits 43 toward the mixing section 41. For example, to mold a structure including a polyurethane resin, reservoir 16 may contain a liquid reactive resin forming material, reservoir 17 a particulate solid recyclable material and reservoir 18 and other reservoirs—colors, catalysts, etc. as required.

To produce high quality molded structures of the invention, it is important that the raw material delivered to the mixing section 41 be uniform in volume and composition. This can be facilitated by providing a continuous flow of raw materials to the mixing section and the immediate transfer of the mixture therefrom onto the cavity surface of the mold assembly 33. However, the volume of the mixture delivered will vary depending upon the particular incremental area being covered at any instant. Also, the delivery will be terminated completely when a molded unit is being removed from the apparatus.

Advantageously, a separate bypass conduit (not shown) is utilized from the end of each inlet conduit 43 at a point adjacent the mixing section 41 back to the respective reservoir. This construction provides for the delivery of a freshly formed uniform mixture from the mixing section even though the distance is considerable between the reservoirs and the mixing section which is located closely adjacent the mold assembly 33. The control portion 15 coordinates the operation of the various system components so the required formulation can flow onto the desired areas of the mold cavity.

Rotation of the mold assembly 33 about its longitudinal axis and arcuate movement of the mold assembly about pivotal connection 29 perpendicular to its longitudinal axis are started and continue while each freshly formed polymeric mixture is transferred from mixing section 41 into the cavity 36 of mold assembly 33. The rotational and arcuate movement is continued to complete the flow of the mixture over all areas being covered. Both movements are controlled within the parameters stored in the memory 55. For particular units, the movements about the respective axes may be continuous and/or intermittent at changing rates. Also, it may be desirable to provide arcuate rotation, that is, movement about an arc such as a rocking motion. Monitors 57 located within the mold assembly 33 signal the process controller 59 when each polymeric mixture has flowed over preselected areas of the mold cavity so the controller can initiate the next step of the molding method.

Figure 6:
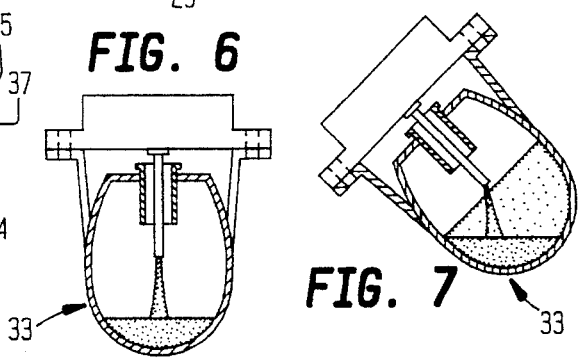
FIG. 6 is a schematic illustration in section of the mold assembly shown, in FIG. 5 during an early molding step with the apparatus of the invention.

FIGS. 6–10 illustrate schematically the molding of an integrally formed structural unit. FIG. 6 shows the initial addition of a mixture into mold cavity 36 while the mold assembly 33 is being rotated about its longitudinal axis in a vertical orientation. The mixture collects in the lowest part of the cavity.

Figure 7:
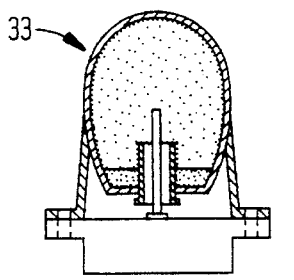
FIG. 7 is a schematic illustration in section of the mold assembly shown in FIG. 5 during an intermediate molding step with the apparatus of the invention.

FIG. 7 shows the mold assembly with its longitudinal axis pivoted counterclockwise about pivotal connection approximately 45 degrees. In this orientation, the mixture collects offset of the normal bottom of the cavity. A coating of the mixture is formed part way up the wall surface of the cavity as the mold assembly is rotated about its longitudinal axis.

Figure 8:
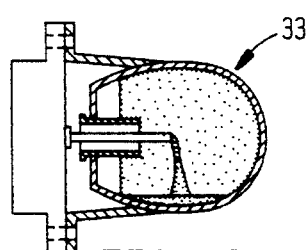
FIG. 8 is a schematic illustration in section of the mold cavity shown in FIG. 5 during a subsequent step with the apparatus of the invention.

FIG. 8 illustrates further pivoting about the pivotal connection until the longitudinal axis is in a horizontal orientation. In this position, the mixture flowing into the mold cavity collects in the lower side of the cavity so that rotation of the mold assembly about its longitudinal axis causes the coating to be deposited over more of the inner cavity surface.

Figure 9:
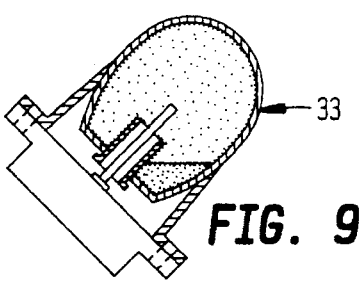
FIG. 9 is a schematic illustration in section of the mold cavity shown in FIG. 5 during a further step with the apparatus of the invention.

FIG. 9 shows the further pivoting of the mold assembly an additional 45 degrees. In this orientation, the excess mixture within the cavity flows downward to the lowest part of the cavity. Longitudinal axis rotation permits the remaining mixture to coat remaining uncoated areas of the cavity.

Figure 10:
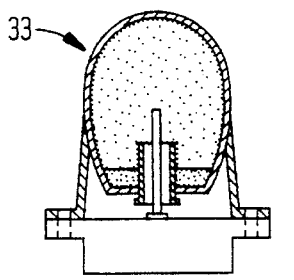
FIG. 10 is a schematic illustration in section of the mold cavity shown in FIG. 5 during a later step with the apparatus of the invention.

Finally, as shown in FIG. 10, if it is desired to provide a thicker coating along one surface such as the open end of the mold cavity, further pivoting about the pivotal connection until the longitudinal axis is in a vertical orientation permits the remaining mixture to flow downward around the open vent 39. Rotation about the longitudinal axis is continued until the mixture has solidified. Complete coating of the mold cavity can be achieved with one rotational motion and one pivoting motion. Utilizing a second pivotal connection along the arm member perpendicular to the first pivotal connection provides further variation and flexibility in molding.

When the molded structure within the mold cavity 36 is sufficiently cured that it possesses structural integrity, rotation is stopped and the mold sections 34 and 35 are separated to free the unit. The molded unit then may be set aside to complete the curing of the resin therein. During this period, the molded structure, free of the mold's restraint, stresses the high density outer skin or layer of the unit. This stressing of the skin increases the strength and puncture resistance thereof and also the structural strength of the unit itself.

The liquid reactive resin forming material employed to produce structures of the invention is selected to be capable of reaction to form the particular resin desired in the final structure. Advantageously, the resin is a thermosetting resin such as a polyurethane or polyester. Should a polyurethane be desired, one reservoir may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like. The use of rapid gelling resin formers enables continuous bonded non-woven fabric matrices to be formed in situ during molding.

The particulate solid additive material may be any of a wide variety of inexpensive materials readily available at a particular job site. Natural mineral particulate material such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

The above description and the accompanying drawings show that the present invention provides a novel multiaxis rotational molding apparatus which not only overcomes the deficiencies and shortcomings of earlier expedients, but in addition provides novel features and advantages not found previously. The apparatus of the invention provides simple inexpensive means for producing uniform high quality products efficiently.

The apparatus of the invention is simple in design and relatively inexpensive. Commercially available materials and components can be utilized in the fabrication of the apparatus using conventional metal working techniques and procedures.

Structures can be produced automatically with the apparatus of the invention by operators with limited experience and aptitude after a short period of instruction. The apparatus is durable in construction and has a long useful life with a minimum of maintenance.

The apparatus of the invention can be utilized to mold a wide variety of different products. Variations in structure, configuration and composition of the products can be achieved simply and quickly with the apparatus of the invention.

It will be apparent that various modifications can be made in the multiaxis rotational molding apparatus described in detail above and shown in the drawings within the scope of the present invention. The size, configuration and arrangement of components can be changed to meet specific requirements. For example, the number of components and reservoirs may be different. Also, the apparatus may include other drive and actuating components and mechanisms. These and other changes can be made in the apparatus described provided the functioning and operation thereof are not adversely affected. Therefore, the scope of the present invention is to be limited only by the following claims.

What is claimed is:

1. Multiaxis rotational molding apparatus including a support portion, a molding portion, a mixing portion and a control portion; said support portion including an arm member disposed in a generally horizontal orientation and having one end extending from an upstanding supporting section; said molding portion including a mold supporting assembly pivotally connected to a free end of said arm member, said mold supporting assembly including an independently rotatable mold connector section, said mold supporting assembly including a central passage therethrough from a pivotal connection with said arm member and through said mold connector section, a mold assembly including at least two separable mold sections forming a substantially enclosed cavity, connecting means selectively securing said mold sections together and to said mold connector section; said mixing portion including an elongated section extending axially within said central passage through said mold supporting assembly adjacent said mold connector section, a mixing section including a plurality of deflector sections disposed along the length thereof, a plurality of inlet conduits extending along said arm member and operatively connected to an inlet end of said mixing section, a hollow probe member extending from an outlet end of said mixing section into said cavity of said mold assembly; said control portion including actuating means rotating said mold connector section and said mold assembly affixed thereto and actuating means pivoting said mold supporting assembly and said mold assembly affixed thereto with respect to said arm member, programmable memory means storing preselected operating parameters, monitoring means sensing operating information from control components, circuitry transmitting signals from said monitoring means to coordinating means comparing said operating information with said operating parameters stored in said memory means and activating said actuating means to control formation of a molded structure in said cavity in a preselected multiaxis mold rotational profile.

2. Multiaxis rotational molding apparatus according to claim 1 wherein said inlet conduits extend through said pivotal connection with said mold supporting assembly.

3. Multiaxis rotational molding apparatus according to claim 1 wherein said pivotal connection of said arm member and said mold supporting assembly includes a swivel coupling.

4. Multiaxis rotational molding apparatus according to claim 1 wherein said arm member includes more than one pivotal connection along a length thereof.

5. Multiaxis rotational molding apparatus according to claim 1 including actuating means axially moving said probe member within said mold cavity.

6. Multiaxis rotational molding apparatus according to claim 1 wherein said actuating means includes a gear motor, a chain and sprockets.

7. Multiaxis rotational molding apparatus according to claim 6 wherein said gear motor is a variable speed motor.

8. Multiaxis rotational molding apparatus according to claim 1 wherein said mold assembly includes a vent disposed concentrically with said probe member.

9. Multiaxis rotational molding apparatus according to claim 1 wherein said support portion includes a base section from which said upstanding supporting section extends.

10. Multiaxis rotational molding apparatus according to claim 1 wherein said monitoring means includes optical fibers extending through said mold sections.

* * * * *